United States Patent

Kleimeyer et al.

[11] Patent Number: 5,538,559
[45] Date of Patent: Jul. 23, 1996

[54] BEARING SUPPORT SYSTEM FOR A ROLL SUBMERGED IN A MOLTEN METAL COATING BATH

[75] Inventors: David L. Kleimeyer, Columbus, Ohio; Ralph W. Martin, Ashland, Ky.; Robert D. Wines, II, Hurricane, W. Va.

[73] Assignee: AK Steel Corporation, Middletown, Ohio

[21] Appl. No.: 252,283

[22] Filed: May 31, 1994

[51] Int. Cl.$^6$ ........................................................ B05C 3/00
[52] U.S. Cl. ............................................. 118/423; 118/419
[58] Field of Search ..................................... 384/245, 418, 384/419, 907.1; 242/548; 226/168, 190, 192, 194; 118/423, 424, 419

[56] References Cited

U.S. PATENT DOCUMENTS

| | | | |
|---|---|---|---|
| 3,595,207 | 7/1971 | Stricker | 118/420 |
| 4,909,485 | 3/1990 | Yamaguch et al. | 266/103 |
| 5,072,689 | 12/1991 | Nakagawa et al. | 118/419 |
| 5,099,780 | 3/1992 | Nappier et al. | 118/33 |
| 5,252,130 | 10/1993 | Ookouchi et al. | 118/423 |

FOREIGN PATENT DOCUMENTS 9103581 3/1991 WIPO.

OTHER PUBLICATIONS

FIGS. 4 and 5 shown at the 1991 Galvanizers Conference in Lexington, Kentucky by Gerald L. Barney.

Primary Examiner—Brenda A. Lamb
Attorney, Agent, or Firm—R. J. Bunyard; L. A. Fillnow; R. H. Johnson

[57] ABSTRACT

The invention includes a vessel (24) for containing a bath (28) of molten coating metal such as zinc, a sink roll (30) submerged into the bath defining a path of travel for a metal strip (12) through the bath with the strip applying force to the roll as a result of tensile load on the strip and a pair of stabilizing rolls (32). Sink roll (30) is supported by a pair of spaced arms (36) and each stabilizing roll (32) is supported by a pair of spaced arms (44). Each roll has a cylindrical body (52) having an outer surface for being in contact with strip (12) and a trunnion (54) projecting axially from each end of the roll body. Each arm (36) has an upper end (38) and a lower end (40), the upper ends being mounted at positions (42) above the vessel and the lower ends for being submerged into the bath. Each lower end of the arms includes means (58) for supporting the roll and means (56) for restraining lateral thrust of the roll. The support means includes an oversized opening (59), a ceramic wear resistant bearing (68) mounted within the opening and a cylindrical sleeve (66) mounted onto each of the trunnions. Each sleeve has an outer wear resistant surface (72). Each of the sleeve mounted trunnions is positioned within and supported by one of the openings. Restraining means (56) includes a stop surface (60) disposed adjacent to the outer end of the trunnion. The bearing surface is at least as wide as the width of the sleeve and the distance between the stop surfaces is greater than the over all length of the roll. This insures that the full width of the outer surface of the sleeve is supported by the bearing during coating of the strip.

16 Claims, 4 Drawing Sheets

BEARING SUPPORT SYSTEM FOR A ROLL SUBMERGED IN A MOLTEN METAL COATING BATH

BACKGROUND OF THE INVENTION

This invention relates to hot dip coating of continuous metal strip with molten metal. More particularly, the invention relates to an improved bearing system for supporting a submerged roll in the bath of the molten coating metal.

Wear resistance has been improved in recent years for steel rolls used on high speed hot dip coating lines. It is common practice for furnace hearth rolls and submerged pot rolls to be overlaid with a protective ceramic coating of oxide, carbide or nitride by known thermal deposition techniques. Dross pickup from the surface of the coating bath to submerged pot rolls is minimized because dross particles do not wet the ceramic roll surface as well as a steel roll surface. Similar improvements have not been made, however, in the bearing systems for supporting these rolls. The service life of present day bearing systems does not economically justify the expense of a pot roll overlaid with a ceramic coating.

Bearings are used for supporting submerged rolls in a hot dip molten metal coating pot. U.S. Pat. 5,099,780 discloses using a pair of spaced arms for supporting submerged sink or stabilizing rolls. Each end of a roll includes an axially extending stub shaft having a temperature and wear resistant sleeve mounted thereon. A metal bushing element is welded into an opening provided in the lower end of each support arm. Each bushing element is provided with an axially extending oversized opening for receiving one of the sleeve mounted stub shafts. The bushing element includes two or more flat bearing surfaces disposed in intersecting planes providing point contact between each bushing element and the sleeve. This bushing element configuration eliminates the tendency for a pot roll to chatter when hot dip coating a metal strip. Nevertheless, this roll support system is unsatisfactory because the service life of the bushing element and sleeve may be less than that of the submerged pot roll. Uneven wear to the bushing element and sleeve caused by lateral thrusting of the pot roll increases friction and causes uneven rotation of the pot roll. Uncontrolled lateral thrusting of the pot roll also causes wear or galling to the stub shafts.

World patent application 91-3581 also discloses a support system for a submerged pot roll. Each end of the pot roll includes an axially extending trunnion having a sleeve mounted thereon. The roll is supported by a pair of spaced arms with the lower end of each arm provided with a housing for receiving one of the sleeve mounted trunnions. Each housing includes a chevron shaped ceramic bearing shell having two flat bearing surfaces disposed in intersecting planes to provide two point contact between each bearing shell and sleeve. The working life of the bearing shell and bushing is increased. Nevertheless, this roll support system is unsatisfactory because a sleeve wider than the bearing surface causes uneven wear when roll thrust occurs thereby resulting in roll chatter.

Accordingly, there remains a need for a bearing support system for a submerged pot roll wherein the support system has a life expectancy at least equal to that of the pot roll to eliminate unplanned coating line interruptions for replacing the support system. There also remains a need for an improved bearing support system for a submerged pot roll to justify the cost of applying a ceramic overlay coating to the surface of the pot roll. There is a further need to control lateral thrusting of the pot roll to eliminate uneven wear to the support system and to prevent galling of the pot roll trunnions.

BRIEF SUMMARY OF THE INVENTION

This invention relates to hot dip coating of continuous metal strip with molten metal. More particularly, the invention relates to an improved bearing system for supporting a submerged roll in the bath of the molten coating metal.

An object of the invention is to provide a bearing system having an operating life at least equal to the operating life of a ceramic coating overlaid onto the surface of the submerged pot roll.

Another object of the invention is to control lateral thrusting of the pot roll while coating the metal strip.

Another object of the invention is to improve coating thickness uniformity on the strip when emerging from the coating bath by controlling strip motion.

The invention includes a vessel for containing a bath of molten coating metal, at least one roll submerged into the bath for defining a path of travel for a metal strip through the bath with the strip applying force to the roll as a result of tensile load on the strip and a pair of spaced arms for supporting the roll. The roll has a cylindrical body having an outer surface for being contacted by the strip and a trunnion projecting axially from each end of the roll body. Each arm has an upper and a lower end, the upper end being mounted at a position above the vessel and the lower end for being submerged into the bath. Each lower end includes means for supporting one end of the roll and means for restraining lateral thrust of the roll. The support means includes an oversized opening, a ceramic wear resistant bearing mounted within the opening and an annular sleeve having an outer wear resistant surface. The sleeve is mounted onto one of the trunnions. One of the sleeve mounted trunnions is positioned within and supported by the opening. The restraining means includes a stop surface disposed adjacent to the outer end of the trunnion supported by the opening for controlling lateral thrust of the roll. The bearing is at least as wide as the width of the outer surface of the sleeve so that the full width of the sleeve is supported by the bearing surface. The distance between the stop surfaces is slightly greater than the distance between the ends of the trunnions so that the full width of both sleeves is supported by the bearing surfaces when coating the strip.

Another feature of the invention is for the aforesaid restraining means to include a thruster arm disposed adjacent to the outer end of the trunnion and mounted to the lower end of the support arm.

Another feature of the invention is for the aforesaid bearing to include a pair of juxtaposed inserts each having a flat bearing surface with the flat surfaces disposed in planes intersecting one another providing two point contact with the sleeve.

Another feature of the invention is for a wear resistant rounded cap being mounted to the end of each of the aforesaid trunnions.

Advantages of the invention include improved strip stability when excess molten coating metal is removed by jet finishing nozzles, increased service life of pot roll bearings and sleeves, uniform wear to pot roll bearings and sleeves, elimination of unplanned coating line interruptions, reduced rolling friction between the pot roll and the support system, all of which reduce maintenance and operating costs of a molten metal coating operation. Additional advantages include elimination of pot roll chatter, elimination of galling to pot roll trunnions and trunnion sleeves and reduced bearing wear.

The above and other objects, features and advantages of the invention will become apparent upon consideration of the detailed description and appended drawings.

BRIEF DESCRIPTION OF THE DRAWINGS

FIG. 4A is an enlarged view of the bearing of FIG. 4.

DETAILED DESCRIPTION OF THE PREFERRED EMBODIMENT

This invention relates to hot dip or immersion coating of continuous lengths of metal strip or foil with molten metal and is for an improved bearing system for supporting a submerged roll in the bath of the molten coating metal. Non-limiting coating metals for use with the invention preferably include commercially pure metals and metal alloys of zinc and aluminum. The continuous lengths of metal strip or foil for use with the invention may include a variety of steels such as low carbon steel, deep drawing steel, chromium alloyed steel, stainless steel as well as non-ferrous metals such as aluminum and aluminum alloys.

Figure 1:
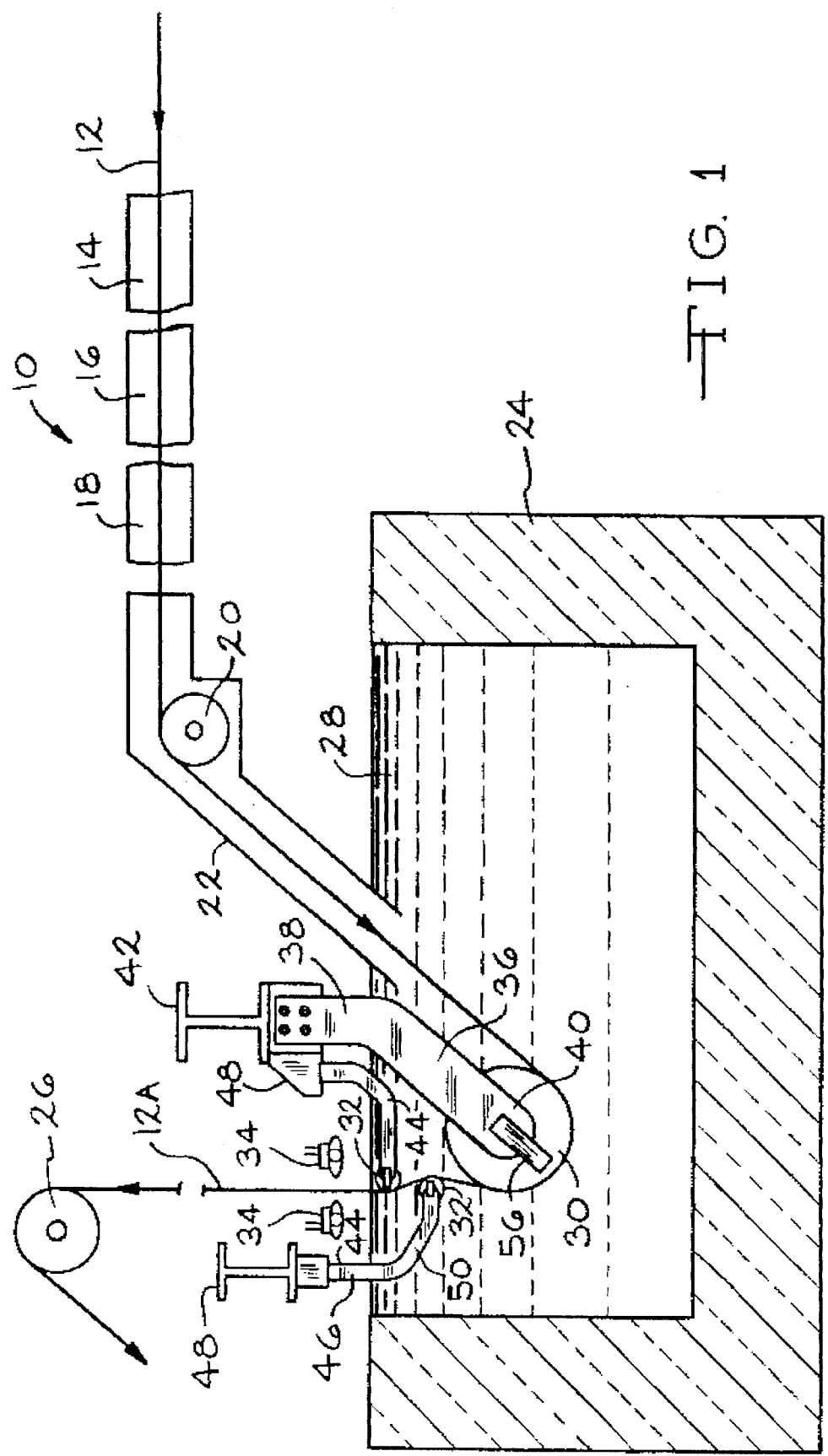
FIG. 1 is a schematic elevation view of a continuous hot dip coating line incorporating the invention.

FIG. 1 illustrates a high speed continuous coating line 10 for coating a moving metal strip 12 with molten metal. Coating line 10 may include in-line strip cleaning and annealing such as a cleaning section 14, a heating section 16 for heating the strip to at least the melting point of the coating metal, a cooling section 18, a turn down roll 20 and a sealed snout 22 for protecting the cleaned metal strip being immersed into a coating vessel 24. The heating, cooling and snout portions of the coming line contain a non-oxidizing protective atmosphere. After the metal strip emerges from vessel 24, the coating metal is solidified and metal coated strip 12A passes around another change of direction roll 26 before passing on to possible additional processing and being rewound into a coil. Alternatively, strip 12 may be cleaned and/or pre-annealed prior to being processed on coating line 10.

Coating vessel 24 is for containing a bath 28 of molten metal, e.g., zinc, and includes one or more submerged pot rolls such as a change of direction or sink roll 30, a pair of stabilizing rolls 32 positioned on opposite sides of strip 12 and a pair of jet finishing nozzles 34 positioned on opposite sides of as-coated strip 12A. Nozzles 34 are supplied with a pressurized gas, e.g. air, for removing excess molten coating metal from strip 12A and for controlling the thickness of the coating layer on each surface of the strip. Nozzles 34 may be enclosed within a sealed enclosure (not shown) in which case the pressurized gas is non-oxidizing to the coating metal, e.g., nitrogen. Sink roll 30 is supported by a pair of spaced arms 36, each arm having an upper end 38 for being rigidly mounted above vessel 24 to a frame 42 and a lower end 40 submerged into bath 28 for supporting one end of roll 30. Each stabilizing roll 32 is supported by a similar pair of spaced arms 44, each arm 44 having an upper end 46 for being rigidly mounted above vessel 24 to a frame 48 and a lower end 50 submerged into bath 28 for supporting one end of roll 32.

Figure 2:
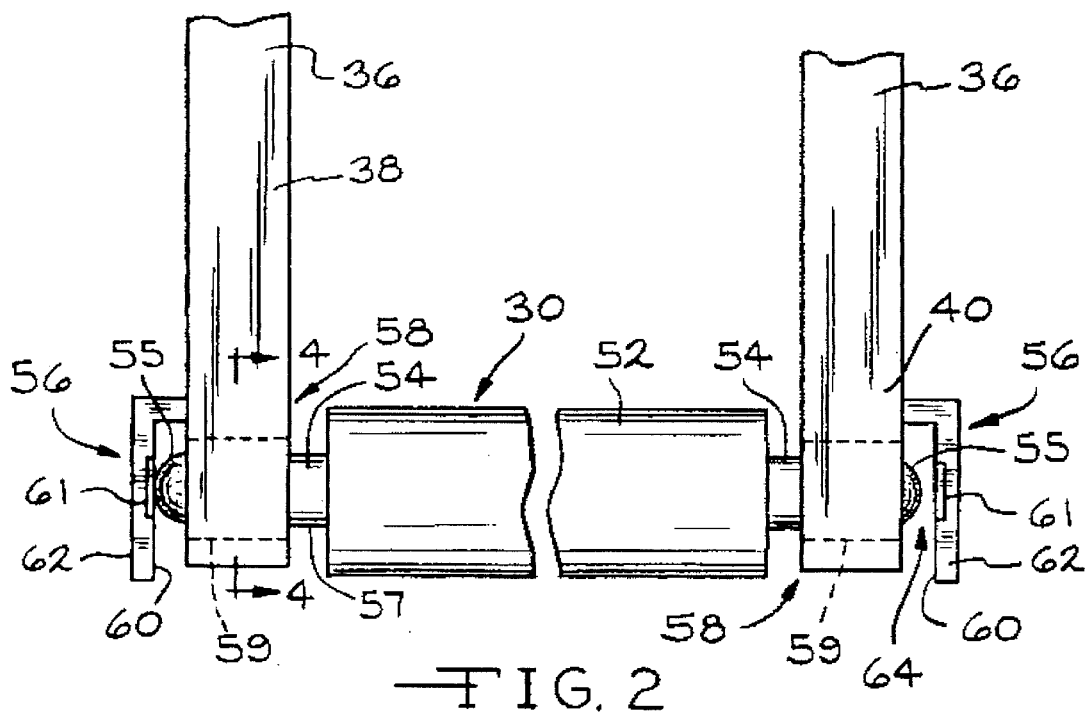
FIG. 2 is a top plan view of a portion of the structure illustrated in FIG. 1 incorporating one embodiment of the invention.
Figure 3:
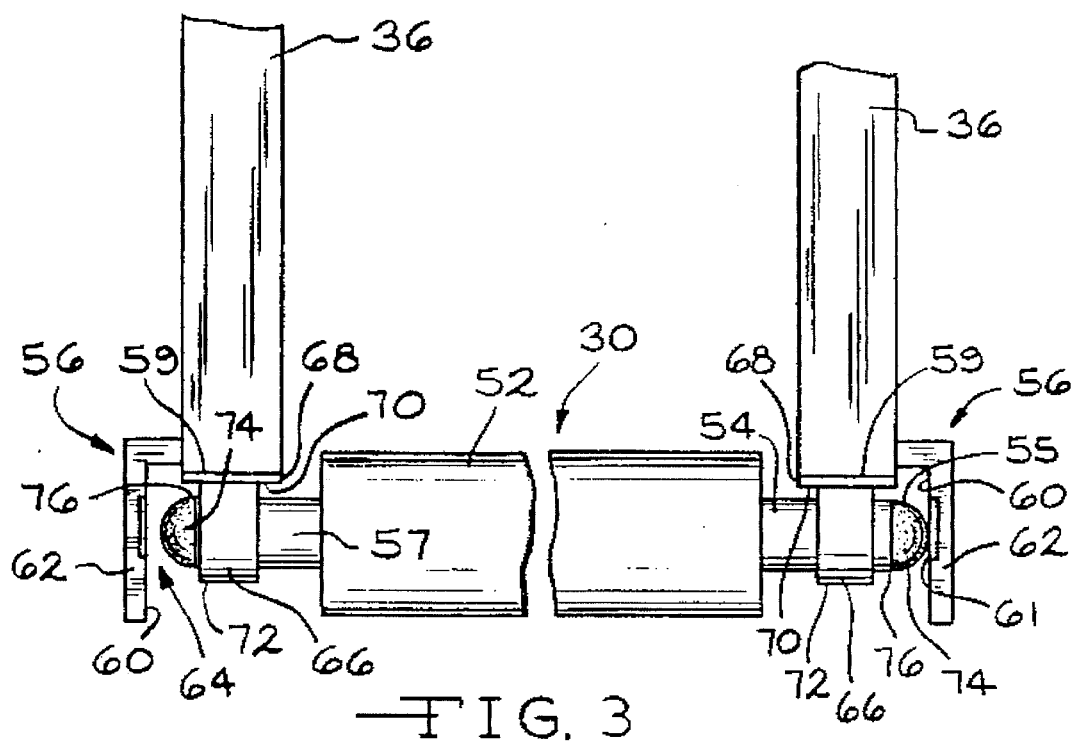
FIG. 3 is similar to FIG. 2 with a portion of the lower end of each of the support arms removed.

FIG. 2 is a top plan view of a portion of the structure of FIG. 1 illustrating one embodiment of a bearing system of the invention for supporting sink roll 30. Since the bearing systems for supporting stabilizing rolls 32 are similar to the one for supporting sink roll 30, details for the construction of a submerged roll and support system will be provided only for sink roll 30. Each roll includes a cylindrical body 52 whose outside surface is for supporting metal strip 12 and a wear resistant trunnion 54 projecting axially from each end of the roll body. The outside surface of roll body 52 preferably is overlaid with a wear resistant protective coating such as tungsten carbide having a thickness of at least 0.7 mm. Each trunnion 54 preferably has a cylindrical outer surface 57 and a wear resistant metal or ceramic hemispherical cap 55 mounted to the end thereof. Cap 55 may be formed of a wear resistant metal composition such as STELLITE 6B (58% Co, 30% Cr, 4% W, 2½% Ni, 3% maximum of Fe, 1½% maximum of Mo, 1.4% Mn, 1% C and 0.7% Si (percentage for elements of STELLITE 6B reflect the percentage by weight) and secured to each trunnion 54 such as by a weld 76 (FIG. 3). Alternatively, the surface of cap 55 may be formed by overlaying a wear resistant oxide, carbide or nitride coating. Each lower end 40 of arms 36 includes means 56 for restraining lateral thrust of sink roll 30 and means 58 for supporting one of trunnions 54. Support means 58 includes an opening for receiving axle portion 57 of one of trunnions 54. Restraining means 56 includes a stop surface 60 disposed adjacent to the outside of the opening. Stop surface 60 preferably includes a thruster arm 62 rigidly connected to lower end 40 of each support arm 36 extending parallel to and away from the lower end of the support arm to a position adjacent to and outside of the opening. Each stop surface 60 may include a wear resistant ceramic insert 61, such as tungsten carbide, mounted to the inside surface of thruster arm 62. One of stop surfaces 60 of thruster arms 62 is located adjacent to each trunnion cap 55 for restraining lateral thrusting of the sink roll.

FIG. 3 is the same as FIG. 2 with a portion of lower end 40 of each support arm 36 removed to illustrate details of support means 58. Support means 58 includes a round oversized opening 59, a wear resistant ceramic bearing 68 is mounted within the opening and an annular wear resistant metal or ceramic sleeve 66. Sleeve 66 is mounted onto surface 57 of each trunnion 54. If outer surface 57 of trunnion 54 is cylindrical, the diameter of the bore of sleeve 66 will be only slightly larger than the outer diameter of the trunnion. A critical feature of the invention is for the inner or bearing surface 70 of each bearing 68 to have a width at least as wide as sleeve 66 so that the full width of outer surface 72 of sleeve 66 is supported by the bearing surface. Preferably, bearing surface 70 of bearing 68 has a width greater than the width of sleeve 66. More preferably, support surface 70 is at least 20% wider than sleeve 66. In the embodiment illustrated in FIG. 3., bearing surface 70 has a width about twice the width of sleeve 66. Sleeve 66 is connected to trunnion 54 such as by being mechanically shrink fitted to prevent rotation relative to the trunnion when the submerged roll is rotated by metal strip 12. This restricts wear to the sleeve rather than the outer surface of the trunnion.

An important feature of this invention is that, by positioning stop surface 60 close to each trunnion cap 55 thereby permitting only minimal lateral movement by the submerged roll, the full width of sleeve 66 on each trunnion 54 is supported by bearing 68 during coating of the strip. The distance between stop surfaces 60 of thruster arms 62 is only slighter greater than the distance between ends 55 of trunnions 54 so that both ends 55 of roll 30 do not contact both surfaces 60 at the same time. By having the stop surface close to each cap is meant this distance difference should be at least 8 mm, preferably 10 to 15 mm. A small gap 64 will always be present on one end or the other between cap 55 and stop surface 60. This gap advantageously eliminates any frictional turning resistance between the submerged roll and the restraining means. This minimizes frictional rolling resistance between the submerged roll and the stop surfaces and minimizes wear to the stop surfaces by the ends of the trunnions.

Figure 4:
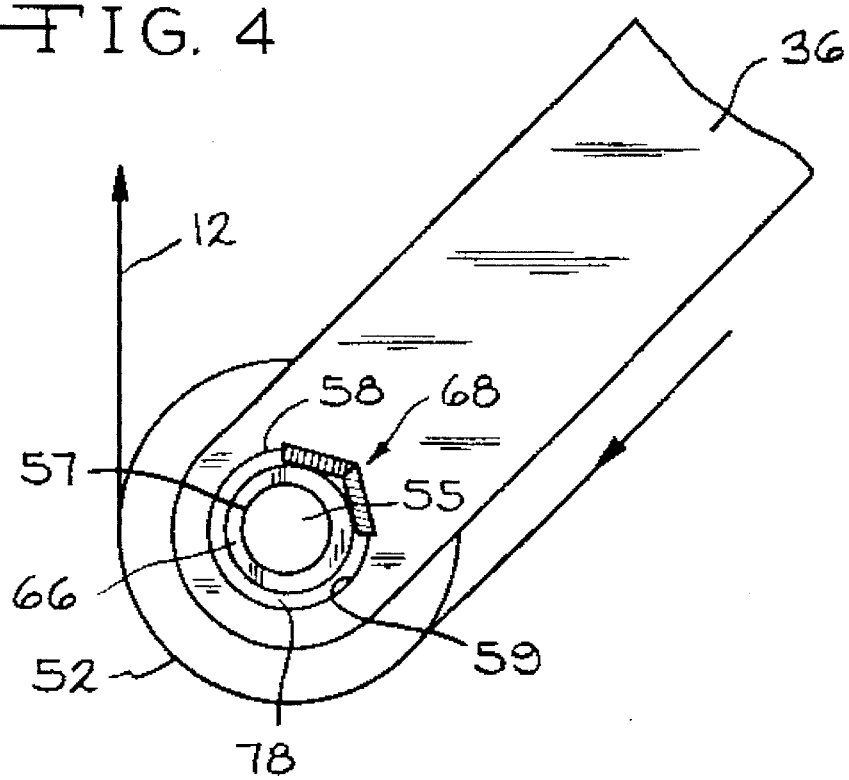
FIG. 4 is a section view taken along line 4—4 of FIG. 2.

FIG. 4 is a section view taken along line 4—4 of FIG. 2 illustrating a preferred embodiment of bearing 68 for supporting submerged rolls in vessel 24. When molten metal is coated onto metal strip 12 from bath 28, the strip is pulled through coating line 10. This tensile force on strip 12 passing around the bottom of sink roll 30 causes the roll to be displaced upwardly and to the right (as viewed in FIGS. 4 and 4A) until surfaces 72 of sleeves 66 contact bearing surfaces 70 of bearings 68. Opening 59 in lower end 40 of arm 36 is oversized so that the outer diameter of sleeve 66 is less than the diameter of opening 59 permitting freedom of movement by sink roll 30. When coating line 10 is operating, tension is maintained on strip 12 and submerged roll 30 is supported by bearings 68, i.e., the operating position.

FIG. 4A illustrates in detail the bearing of FIG. 4. Bearing 68 preferably is formed from a pair of trapezoidal shaped juxtaposed inserts with a first insert 82 having an inner planar or flat bearing surface 86 and a second insert 84 having an inner flat bearing surface 88. The intersection of bearing surfaces 86 and 88 forms an obtuse inner angle 89, preferably greater than 100°, more preferably between 110° and 145°, converging at a joint 90. An arcuate groove 94 may be machined within opening 59 for receiving bearing inserts 82 and 84. Each end 96 of groove 94 is undercut by an acute angle 99 so that the bearing inserts are retained within groove 94, even when the trunnion sleeves do not contact the bearing inserts. The wedging action at joint 90 results in bearing 68 being tightly locked within groove 94 thereby preventing molten metal from entering the bearing seats. When bearing surfaces 86 and 88 are flat, two point contact occurs between sleeve 66 and points of tangency 92 when tensile force is applied to strip 12. This two point contact (line contact when viewed in FIG. 3) minimizes rolling frictional resistance of the sleeve against the bearing that otherwise would exist if the bearing surfaces were arcuate. When tension is removed from strip 12 such as during a coating line interruption, sink roll 30 is displaced downwardly a short distance within space 78 of oversize opening 59 with sleeves 66 no longer contacting bearing 68. This is the unloaded or non-operating position illustrated in phantom by dotted lines 80. In this non-operating position of the submerged roll, bearing inserts 82 and 84 remain tightly wedged within groove 94.

Figure 5:
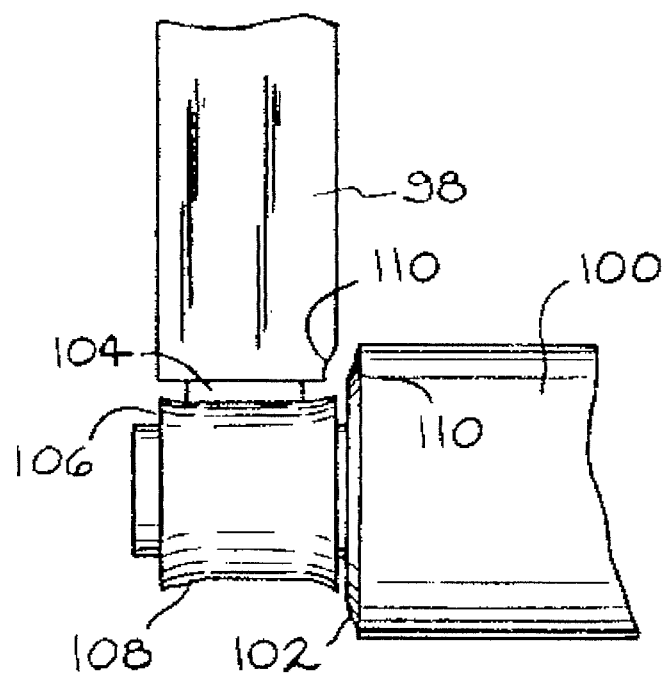
FIG. 5 is a schematic view of a conventional bearing for supporting a pot roll illustrating uneven wear to a trunnion sleeve and galling to a support arm.
Figure 6:
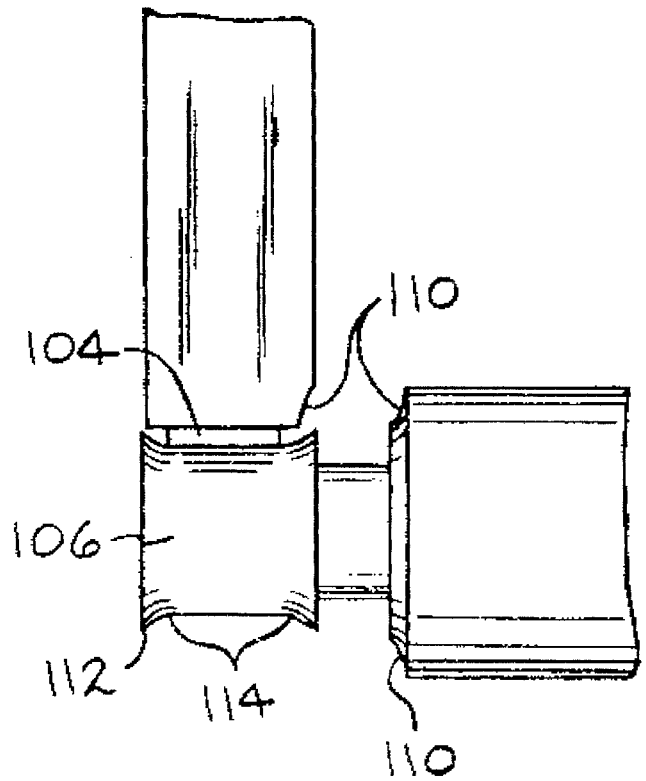
FIG. 6 is similar to FIG. 5 illustrating advanced wear and galling to the trunnion sleeve.

In the discussion above relating to FIG. 3, it was indicated the width of bearing surface 70 of bearing 68 is at least as wide as sleeve 66 so that the full width of outer surface 72 of sleeve 66 supported by bearing surface 70. FIG. 5 is a schematic view illustrating the type of uneven wear frequently occurring to a conventional bearing for supporting a submerged pot roll when the width of the bearing is less than the width of the sleeve. When a bearing 104 has a width less than a trunnion sleeve 106, uneven wear 108 on the outside surface of sleeve 106 is likely to occur. Furthermore, without some means for restraining lateral thrust of a submerged pot roll 100, end 102 of roll 100 and the lower end of support arm 98 are likely to become galled as indicated at 110 on support arm 98 and roll end 102. With the additional passage of time as illustrated in FIG. 6, wear to outside surface 112 of sleeve 106 becomes more severe and uneven. Each of the lateral edges of bearing 104 eventually forms gouges 114 in 106 resulting in premature failure.

A trial using the invention will now be described. A low carbon steel strip having a thickness of about 0.89 mm and a width of about 122 cm was conventionally cleaned, heated and then immersed into a molten bath of zinc. The vessel included pot roll equipment similar to that illustrated in FIG. 1. A cylindrical metal sleeve having a width of 6.3 cm, an inner diameter of 11.4 cm and an outer diameter of 14.6 cm was mounted onto both trunnions of a sink roll. The overall length of the sink roll between the ends of the trunnions was 256.3 cm at galvanizing operating temperature. The composition of the sleeve was STELLITE 6B. The lower end of each support arm included an oversized opening having a diameter of about 15.2 cm for receiving one end of the sink roll and a thruster arm rigidly connected to the lower end of each support arm. A wear resistant tungsten carbide insert was provided on the inside surface of each thruster arm adjacent each arm opening. The distance between the stop surfaces was 257.5 cm at galvanizing operating temperature. A tungsten carbide bearing was formed from a pair of trapezoidal shaped inserts, each insert being of the same size. Each bearing insert had an inner flat bearing surface. The bearing inserts were mounted into a machined groove provided within the opening in the lower end of each support arm. The adjacent surfaces of the bearing inserts formed an obtuse inner angle of about 135°. Each end of the groove was undercut by an acute angle of about 45° so that the bearing inserts were tightly retained within the groove at all times. The width of the bearing inserts, as viewed in FIG. 3, was about 12.7 cm. As indicated above, the width of the sleeve was about half, e.g., 6.3 cm, the width of the bearing inserts. Life of conventional bearing support systems had averaged 3.5 days while the life of sink rolls overlaid with a protective cobalt based coating had averaged about 7 days. With the improved bearing support system of the invention in this trial, the life of the bearing and sleeve was increased to 21 days, well in excess of the normal life expectancy of a submerged pot roll. In fact, very little visual wear could be observed to the bearing surfaces of the bearing inserts. The primary reason for this dramatic increase in the wear life of the sleeve is because of the uniform wear to the outside surface of the sleeve. Uniform wear is insured when the bearing surface is at least as wide as the outside surface of the trunnion sleeve and lateral thrust of the sink roll is controlled so that the full width of the outside surface of the sleeve is in contact with the bearing surface whenever tension is applied to the metal strip.

A satisfactory wear resistant material for the bearings and stop surface inserts was determined to be tungsten carbide during the trial of this invention. Other ceramic materials could be used as well. For example, carbide type ceramics such as $SiC$, $B_4C$, $TiC$, $ZrC$; nitride type ceramics such as $Si_3N_4$, $AlN$, $TiN$, and $ZrN$; boride type ceramics such as $BN$, $ZrB_2$ $TiB_2$ and oxide type ceramics such as $ZrO_2$, $Cr_2O_3$ could be used.

It will be understood various modifications can be made to the invention without departing from the spirit and scope of it. Therefore, the limits of the invention should be determined from the appended claims.

What is claimed is:

1. An apparatus for continuous hot dip coating metal strip with molten metal, comprising:

a vessel for containing a bath of molten coating metal, at least one roll for being submerged into the bath defining a path of travel for a metal strip through the bath with the strip applying force to the roll as a result of tensile load on the strip and a pair of spaced arms, the roll having a cylindrical body having an outer surface for being in contact with the strip and a trunnion projecting axially from each end of the body, each arm having an upper end and a lower end, the upper ends mounted at a position above the vessel, each of the lower ends for being submerged into the bath and including means for supporting the roll and means for restraining lateral thrust of the roll, each support means including an oversized opening, a ceramic wear resistant bearing mounted within the opening and a cylindrical wear resistant sleeve mounted onto each of the trunnions, each sleeve having a width extending parallel to the longitudinal axis of the trunnion, each of the trunnions being disposed within and supported by one of the openings, each bearing including a bearing surface having a width extending parallel to the longitudinal axis of the trunnion, the restraining means including a stop surface disposed adjacent to an end of one of the trunnions, the width of the bearing surface being greater than the width of the sleeve, the distance between the stop surfaces being greater than the over all length of the roll whereby the width of the sleeve is supported by the bearing during coating of the strip.

2. The apparatus of claim 1 wherein the bearing surface has a width at least 20% greater the width of the sleeve.

3. The apparatus of claim 1 wherein the bearing surface has a width twice the width of the sleeve.

4. The apparatus of claim 1 wherein the bearing includes a pair of juxtaposed inserts, each insert having a flat bearing surface.

5. The apparatus of claim 4 wherein the inserts are trapezoidal shaped and the flat bearing surfaces are disposed in planes intersecting one another in an obtuse angle.

6. The apparatus of claim 5 wherein the obtuse angle is greater than 100°.

7. The apparatus of claim 1 wherein the trunnion end is wear resistant hemispherical shaped.

8. The apparatus of claim 1 wherein the roll is a sink roll and further including two additional pairs of spaced arms, each additional pair of arms for supporting one of a pair of stabilizing rolls.

9. The apparatus of claim 1 wherein the stop surface is a thruster arm mounted to the lower end of the support arm.

10. The apparatus of claim 9 wherein the stop surface is wear resistant.

11. The apparatus of claim 10 wherein the stop surface is tungsten carbide.

12. The apparatus of claim 1 wherein the roll body has an outer protective wear resistant surface coating.

13. The apparatus of claim 1 wherein the bearing is tungsten carbide.

14. The apparatus of claim 1 wherein the bearing is mounted in a groove provided within the arm opening.

15. An apparatus for continuous hot dip coating metal strip with molten metal, comprising:

a vessel for containing a bath of molten coating metal, at least one roll for being submerged into the bath defining a path of travel for a metal strip through the bath with the strip applying force to the roll as a result of tensile load on the strip and a pair of spaced arms, the roll having a cylindrical body having an outer protective wear resistant surface coating for being in contact with the strip and a trunnion projecting axially from each end of the body, each arm having an upper end and a lower end, the upper ends mounted at a position above the vessel, each of the lower ends for being submerged into the bath and including means for supporting the roll and means for restraining lateral thrust of the roll, each support means including an oversized opening, a ceramic wear resistant bearing mounted within the opening and a cylindrical wear resistant sleeve mounted onto each of the trunnions, each sleeve having a width extending parallel to the longitudinal axis of the trunnion, each of the trunnions being disposed within and supported by one of the openings, each bearing including a pair of juxtaposed inserts, each insert having a flat bearing surface, the bearing surface having a width extending parallel to the longitudinal axis of the trunnion, the bearing surfaces disposed in planes intersecting one another in an obtuse angle, the restraining means including a stop surface disposed adjacent to an end of one of the trunnions, the width of the bearing surface being greater than the width of the sleeve, the distance between the stop surfaces being greater than over all length of the roll whereby the width of the sleeve is supported by the bearing during coating of the strip.

16. An apparatus for continuous hot dip coating metal strip with molten metal, comprising:

a vessel for containing a bath of molten coating metal, at least one roll for being submerged into the bath defining a path of travel for a metal strip through the bath with the strip applying force to the roll as a result of tensile load on the strip and a pair of spaced arms, the roll having a cylindrical body having an outer protective wear resistant surface coating for being in contact with the strip and a trunnion projecting axially from each end of the body, each of the trunnions including a hemispherical shaped end, each arm having an upper end and a lower end, the upper ends mounted at a position above the vessel, each of the lower ends for being submerged into the bath and including means for supporting the roll and means for restraining lateral thrust of the roll, each support means including an oversized opening, a ceramic wear resistant bearing mounted within the opening and a cylindrical wear resistant sleeve mounted onto each of the trunnions, each sleeve having a width extending parallel to the longitudinal axis of the trunnion, each of the trunnions being disposed within and supported by one of the openings, each bearing including a pair of juxtaposed trapezoidal shaped inserts, each insert having a flat bearing surface, the bearing surface having a width extending parallel to the longitudinal axis of the trunnion, the bearing surfaces disposed in planes intersecting one another in an obtuse angle, the restraining means including a thruster arm positioned adjacent to an end of the trunnion, the thruster arm being mounted to the lower end of the support arm, the width of the bearing surface being greater than the width of the sleeve, the distance between the stop surfaces being greater than over all length of the roll whereby the width of the sleeve is supported by the bearing during coating of the strip.

* * * * *